Figure 1:
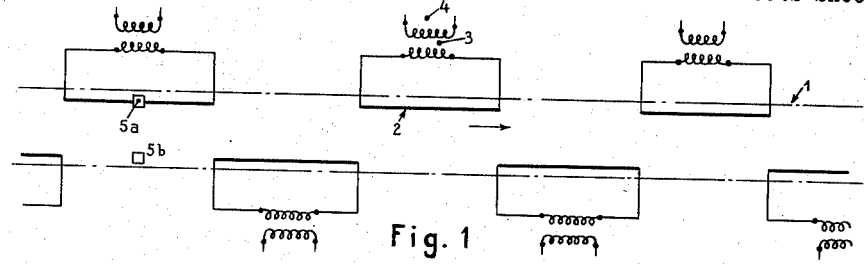

Aug. 20, 1957 M. E. BALLERAIT 2,803,743
CONTROL SYSTEM FOR REGULATING THE SPEED OF VEHICLES
Filed Feb. 26, 1952 3 Sheets-Sheet 1

*Inventor*
*Marcel Eugene Ballerait*
*By Robert E. Burns*
*Attorney*

United States Patent Office 2,803,743
Patented Aug. 20, 1957

2,803,743

CONTROL SYSTEM FOR REGULATING THE SPEED OF VEHICLES

Marcel Eugene Ballerait, Paris, France, assignor to Les Vehicules Guides Sur Pneumatiques, Paris, France, a corporation of France Application February 26, 1952, Serial No. 273,477

Claims priority, application France March 7, 1951

14 Claims. (Cl. 246—182)

The present invention relates to the control of the speed regulation of vehicles, and it consists of a system for such control, whereby a vehicle or train of vehicles will have at every point of the route a speed equal to that of a given ideal run. For convenience of expression, the term "vehicle" is herein used to designate either a single vehicle or two or more vehicles connected together as, for example, in a train, it being understood that in a train the control equipment will ordinarily be installed on the locomotive or on one or more of the individual cars.

This control system comprises essentially the provision along the route of sections of transmitter cable traversed by a periodic electric current and placed in two staggered lines on alternate sides, the length of each cable section being proportional to the speed desired for the vehicles in the vicinity of that section, so that the time taken by a vehicle to travel along a cable section has always one and the same predetermined value T if the vehicle is travelling at the desired speed, while upon each vehicle or train of vehicles there are provided two receivers, the first of which is arranged to be energized by one of the lines of cable sections, and the second by the other line, and means for increasing or decreasing the speed of the vehicle or train according to whether the duration of energization of each receiver is proportionately greater or less (in a definite proportion) than the ideal time T.

A separate source of current may be provided for each cable section, or the cable sections in the same line or in the two lines may likewise be connected in series provided that their connectors are arranged so to have no influence upon the receivers, the return of current being effected, if so desired, by one and the same cable for the two lines. Lastly, the cable sections may be formed by a single cable arranged with sections alternately in the two lines, the return of current being effected by a separate conductor arranged so as to have no influence upon the receivers, or through the ground.

The improved control system preferably comprises at least one control relay or equivalent device which, when energized by a reeciver, causes an increase of the speed of the vehicle, and at least one other control relay or equivalent device which, in its position of rest, allows the vehicle braking means to operate, the receivers being arranged so as to energize the first relay when the duration of energization of the said receivers exceeds a time $T'_1$ which is greater than the time T, and thereafter to maintain said relay energized so long as the said duration exceeds a time $T''_1$ which is less than T, and to energize the second relay when the duration of energization of the receivers exceeds a time $T'_2$ which lies between $T'_1$ and T, and are thereafter to keep said first relay energized so long as the said duration is greater than a time $T''_2$ and less than $T''_1$.

If the vehicle travels too slowly, the time $x$ which it takes to travel along a section of transmitter cable is greater than $T'_1$, and also greater than $T'_2$, so that the two control relays are energized; in consequence, the system effects an increase of speed.

If the vehicle reaches the prescribed speed and slightly exceeds it, the time $x$ then lying between $T''_1$ and $T''_2$, the second relay only is kept energized and the means for causing an increase of the speed as well as the braking means are out of action. If thereafter the vehicle travels too fast, the time $x$ will be less than $T''_2$, so that the two relays will be deenergized and the braking means will come into action.

This braking causes an increase of the time $x$.

The two relays remain de-energized when $x$ increases and exceeds $T''_1$, then T, and it is only when the vehicle travels slightly less than the prescribed speed, the time $x$ being then greater $T'_2$, that the second relay becomes energized, again, so that the means for causing increase of the speed as well as the braking means are then out of action.

When the vehicle thereafter travels slowly enough for the time $x$ to be greater than $T'_1$, the two control relays are energized and the system again ensures an increase of the speed.

The attainment of the ideal time T can be determined on board the vehicle by any chronometric device, acting constantly or not, capable of checking the time which elapses from the start or the end of the operation of a receiver.

It is possible, for example, to use an apparatus adapted to revolve at constant speed and arranged to be automatically set in motion at the start of each operation of a receiver, contacts upon this apparatus coming into action at the end of a convenient time so as to bring the above-mentioned speed-regulating means into operation.

It is likewise possible, for comparing the time $x$ with the ideal time T, to use chronometric relays the operation of which is adjusted so as to close their working contacts or their rest contacts with a delay corresponding to the fractions of a second corresponding to the times which it is desired to check. It is also possible to use a device employing electronic tubes or an electro-mechanical device capable of effecting successively the feeding of the circuits in a manner known per se at predetermined time intervals after a starting point coinciding with the energizing of a receiver.

The improved control system can be applied not only to trains or single vehicles travelling on railways or tramways, but also, for example, to road vehicles.

Other features of the invention will appear in the course of the following description in which reference is made to the accompanying drawings, given by way of non-limiting example, and in which:

Figs. 1 to 5 show schematically various arrangements of transmitter cables; and

Figure 6A:
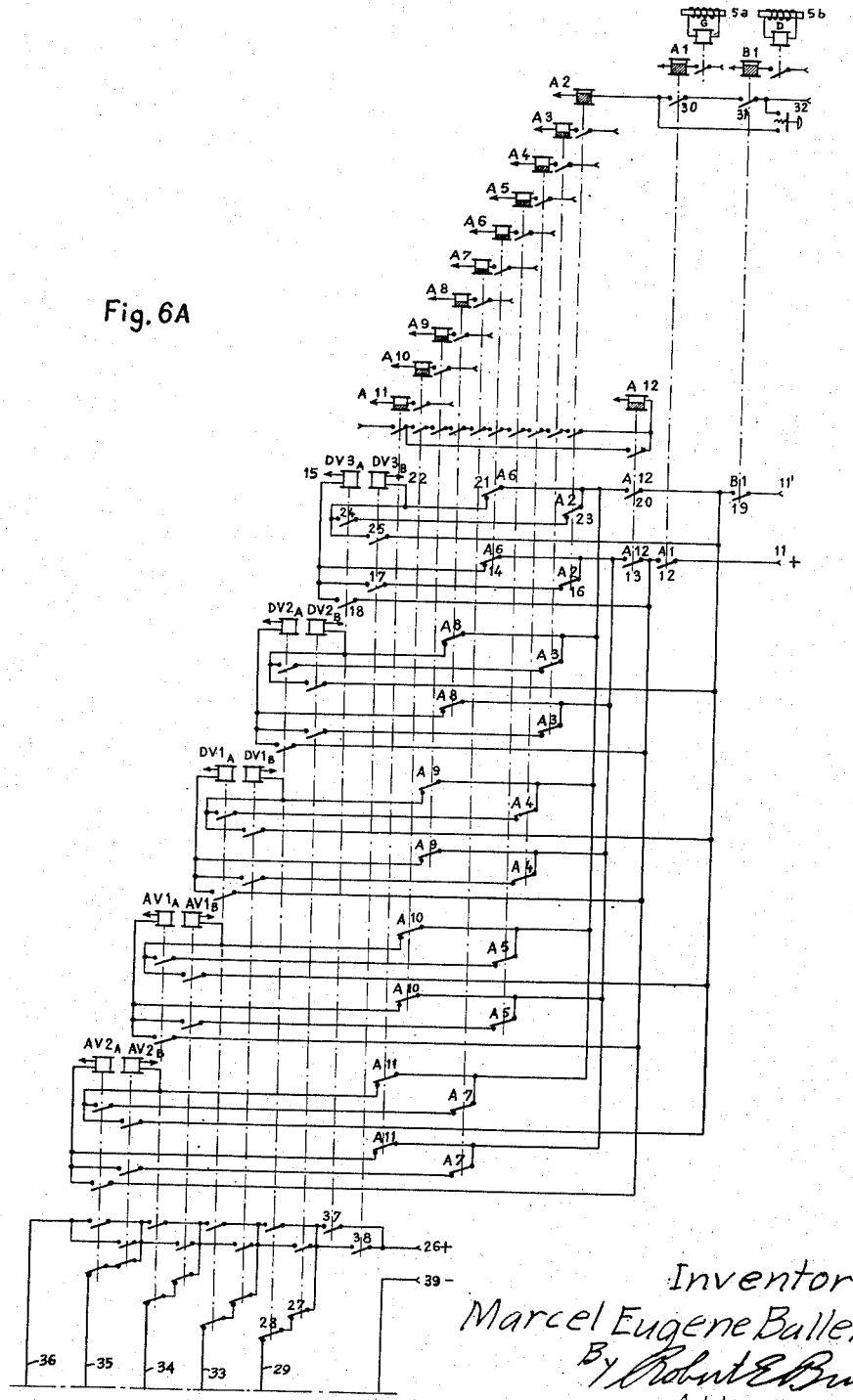
Figure 6B:
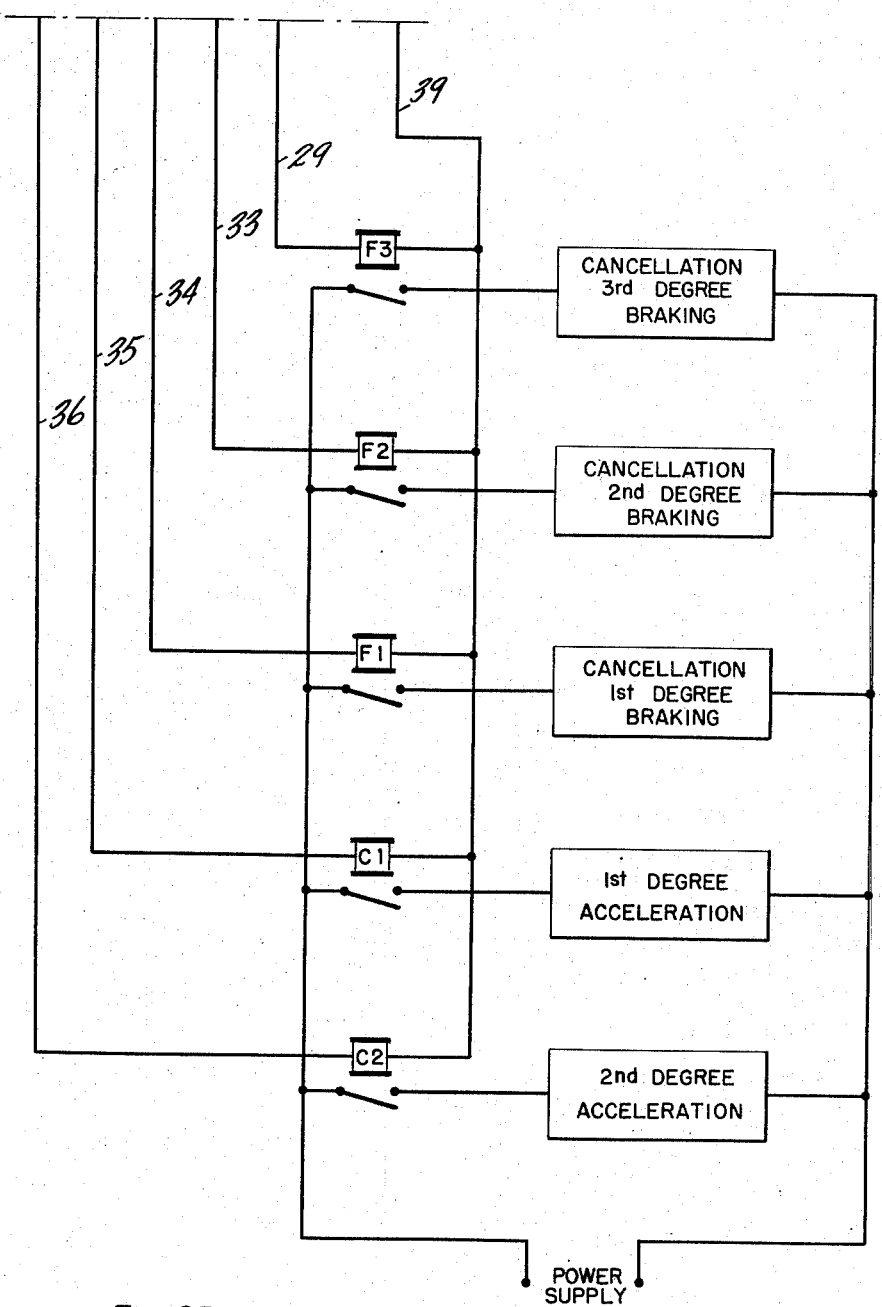

Figs. 6A and 6B are together a diagram of an apparatus for comparing the actual time of energization of the receivers with the ideal time T, and for regulating three degrees of braking action and two degrees of acceleration of the vehicle as a function of the relation $x/T$, according to a program such as that defined in the table shown below, it being clearly understood that other programs can be provided and carried out:

| Acceleration or Deceleration | Initiation | Maintenance | Cancellation |
| --- | --- | --- | --- |
| 2nd-degree acceleration. | $x > T(1+17.6\%)$ | $x \leqq T(1+4\%)$ | $T(1+4\%) > x$ |
| 1st-degree acceleration. | $x > T(1+14.2\%)$ | $x \leqq T(1-2.8\%)$ | $T(1-2.8\%) > x$ |
| Coasting | $T(1+14.2\%) > x > T(1+10.8\%)$ | $x > T(1-6.2\%)$ $x \leqq T(1-6.2\%)$ | $T(1-6.2\%) > x$ |
| Nullifying 1st-degree braking. | | | |
| Nullifying 2nd-degree braking. | $x > T(1+7.4\%)$ | $x \leqq T(1-9.6\%)$ | $T(1-9.6\%) > x$ |
| Nullifying 3rd-degree braking. | $x > T(1+0.6\%)$ | $x \leqq T(1-13\%)$ | $T(1-13\%) > x$ |

It is obvious that the present invention makes it possible readily to provide for a control program with a different number of values of $x$ as a reference, and to modify the size of the steps in the regulation and in the maintenance thereof, according to whether it is desired to obtain more stable running of the vehicle or, on the contrary, stricter adherence to the ideal run.

In Fig. 1, there is seen part of a vehicle track or route 1 along which there are arranged sections of transmitter cable such as 2, each section being connected by means of a transformer 3 to a source of periodic current 4. The cable sections 2 are placed in two lines, staggered on alternate sides of the route, and the length of each section is proportional to the speed desired for the vehicle, so that the time taken by the latter to travel along one cable section has always the same value T if the vehicle is moving at the desired speed. It is seen that the cable sections situated at the right hand side of Figure 1 are shorter length than those at the left, which means that the vehicle is to slow down when travelling in the direction of the arrow.

Upon opposite sides of the vehicle are placed two receivers 5a and 5b, of which the first is aligned with one of the lines of transmitter cable sections, for example so as to travel above this line, and the second aligned with the other. These receivers are adapted, for example in the manner to be described hereinafter, to cause an increase or decrease of the speed of the vehicle according to whether the duration of their energization is greater or less than one which approximates the ideal time T.

Figure 2:
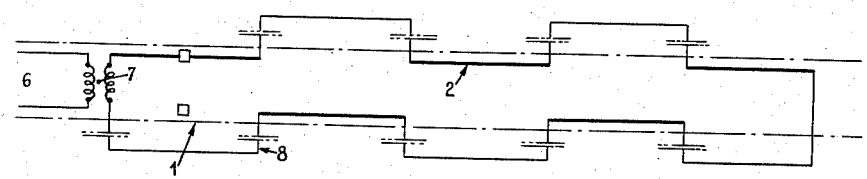

In the arrangement of Fig. 2, the transmitter cable sections are connected in series and fed from a single source 6, by means of a transformer 7. The connections 8 between the cable sections are effected in a suitable manner so as to have no influence upon the receivers. For example, these connections may be spaced away from the route 1, as shown in the drawing.

Figure 3:
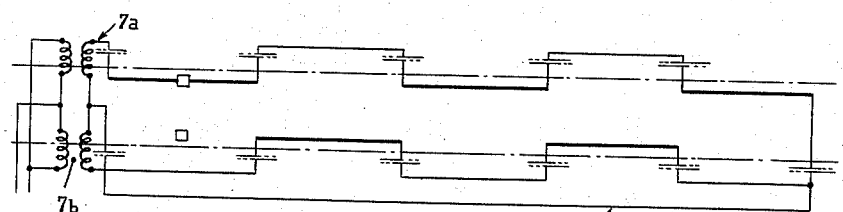

In the arrangement of Fig. 3, each of the lines of cable sections is fed by means of an individual transformer 7a or 7b, the return of current taking place through a common conductor 9.

Figure 4:
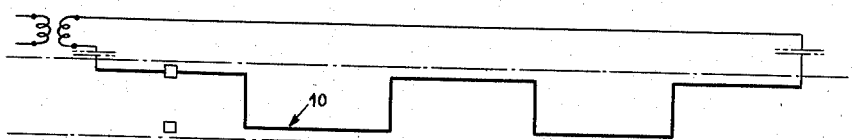
Figure 5:
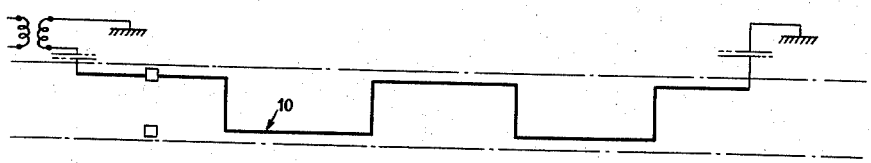

In the arrangement of Fig. 4, the different cable sections are provided by one and the same cable 10 disposed in steps to provide the two staggered lines, with return by a separate conductor disposed so as not to affect the receivers. Fig. 5 illustrates an arrangement like Fig. 4 but with the return through ground.

The arrangement shown in Fig. 6 comprises relays G and D energized respectively by the receivers 5a and 5b in such a way that, when the vehicle travels along the transmitter cables, the relays G and D are energized alternately without discontinuity, the working contact of the relay G being opened at the moment when the working contact of the relay D is closed, and vice versa. The working contact of the relay G, as well as that of the relay D, will therefore remain closed during the time $x$ which is to be checked.

A relay $A_1$ repeats the position of the relay G with a lag which prolongs its duration of closure, this resulting first from the energization time peculiar to this repeater relay $A_1$ and secondly from its delay in dropping. By the expressions "energization time" and "dropping delay," there are meant respectively the time at the end of which the relay closes its working contacts after the completion of the energizing circuit, and the time at the end of which the relay closes its rest contacts after interruption of the energizing circuit. Moreover, there will be designated hereinafter by the expressions "time of change-over upon dropping" and "time of change-over upon energization" respectively, the time between the opening of the working contacts and the closure of the rest contacts, and the time between the opening of the rest contacts and the closure of the working contacts.

The working contacts of the relay $A_1$ therefore remain closed during the time $x$, increased by the dropping delay time $t_1$ and decreased by the energization time $a_1$ and the time of change-over upon dropping $b_1$, peculiar to this relay, i. e. during the time $x + t_1 - a_1 - b_1$.

The time during which the working contacts of the relay $A_1$ are open is the difference between the time $2x$ which separates two successive closures of these working contacts and the time $x + t_1 - a_1 - b_1$, during which these contacts are closed, i. e. $x + a_1 + b_1 - t_1$.

A relay $B_1$ similar to the relay $A_1$ repeats in a similar way the position of the relay D so that its working contacts are likewise open during the time $x + a_1 + b_1 - t_1$.

By means of their working contacts 30 and 31 connected in series, the relays $A_1$ and $B_1$ control a cascade of delayed-drop relays $A_2, A_3, \ldots A_{11}$. A push button 32 placed in parallel with the contacts 30 and 31 allows the apparatus to be set in operation. It will be noted that the energization circuit of the relay $A_2$ is completed during the time that one of the relays $A_1$ or $B_1$ continues to hold its working contacts, due to its own delay in dropping after it has itself ceased to be under voltage, i. e. after the moment when the other relay $B_1$ or $A_1$ has in turn been energized. Hereinafter, the dropping delay time of a relay $n$ will be designated $t_n$, its energization time by $a_n$, its time of change-over on dropping by $b_n$ and its time of change-over upon energization by $c_n$, where $n$ is the number of the respective relay.

The time during which voltage is applied to the relay $A_2$ is equal to $t_1 - a_1 - b_1$.

The time during which the relay $A_2$ holds its working contacts is the time during which voltage is applied to this relay $A_2$, increased by the dropping delay time $t_2$ and decreased by its own time of energization $a_2$ as well as by its time of change-over upon dropping $b_2$, i. e. $t_1 + t_2 - a_1 - a_2 - b_1 - b_2$.

The time $T_2$ during which the relay $A_2$ holds its rest contacts is equal to the time $x$ which separates two successive energizations of this relay $A_2$, decreased by the time of its change-over upon dropping $b_2$, by the time of its change-over upon energization $c_2$ and by the time during which it holds its working contacts, i. e.

$$T_2 = x - (t_1 + t_2 + c_2 - a_1 - a_2 - b_1)$$

The time during which voltage is applied to the relay $A_3$ is the time during which the relay $A_2$ holds its working contacts.

The time during which the relay $A_3$ holds its working contacts is the time during which voltage is applied to it, increased by its dropping delay $t_3$ and decreased by its own time of energization $a_3$ as well as by the time of its change-over upon dropping $b_3$, i. e.

$$t_1 + t_2 + t_3 - a_1 - a_2 - a_3 - b_1 - b_2 - b_3$$

The time $T_3$ during which the relay $A_3$ hold its rest contacts is equal to the time $x$ which separates two successive energizations of this relay $A_3$, decreased by the time of its change-over upon dropping $b_3$, by the time of its change over upon energization $c_3$ and by the time during which it holds its working contacts, i. e.

$$T_3 = x - (t_1 + t_2 + t_3 + c_3 - a_1 - a_2 - a_3 - b_1 - b_2)$$

The same reasoning applied to the relays $A_4$ to $A_{11}$ gives the times during which each of these relays holds its working contacts and its rest contacts. The results are given in the following table:

| Relay Symbols | Values of $x$ above which the relays no longer close their rest contacts | Times during which the relays hold their rest contacts |
|---|---|---|
| $A_2$ | $X_2 = (t_1+t_2+c_2) - (a_1+a_2+b_1)$ | $T_2 = x - X_2$ |
| $A_3$ | $X_3 = (t_1+t_2+t_3+c_3) - (a_1+a_2+a_3+b_1+b_2)$ | $T_3 = x - X_3$ |
| $A_4$ | $X_4 = (t_1+t_2+t_3+t_4+c_4) - (a_1+a_2+a_3+a_4+b_1+b_2+b_3)$ | $T_4 = x - X_4$ |
| . | . | . |
| $A_{11}$ | $X_{11} = (t_1+t_2+ \ldots t_{11}+c_{11}) - (a_1+a_2+ \ldots a_{11}+b_1+b_2+ \ldots b_{10})$ | $T_{11} = x - X_{11}$ |

The values $X_2, X_3 \ldots X_{11}$ are fixed, being the characteristics of the chronometric relays, which can be determined with accuracy. They are equated to the totals of the intangible values $a$, $b$, and $c$ (time of energization, time of change-over), which depend upon the type of relay employed, and the values $t$ (time of dropping relay) which are capable of adjustment with great precision by known methods of construction. Moreover, all precautions are taken, by suitable means, to ensure that the times of operation of the chronometric relays shall not be affected by variations of the voltage of the source of current supplying the control system on the vehicle, or by variations of the temperature of the apparatus.

It will be understood that by giving suitably selected increasing values to $X_2, X_3 \ldots X_{11}$, it is possible to cancel out $T_2, T_3 \ldots T_{11}$ respectively for values of the vehicle speed differing from the ideal of theoretical speed in proportions sufficient to produce the operation or the cutting out of the driving motors, or else the operation or the cancellation of the braking means, and to obtain any desirable gradation of these controls.

The arrangement shown in Fig. 6 comprises ten control relays designated by the letters DV and AV and applied in pairs to each of the five degrees of regulation taken as an example, viz., three degrees of braking and two degrees of motor operation, illustrated as relays $F_1$, $F_2$ and $F_3$ for the braking means and relays $C_1$ and $C_2$ for operation of the motors. The degree of braking and of motor operation increases in accordance with the value of the indices.

The initials DV have been adopted for the regulating relays of which the de-energization causes a decrease of speed by brake operation.

The initials AV have been adopted for the control relays of which the energization causes an increase of speed by motor operation.

The functions of these ten relays are as follows: The relay $DV2_A$ or $DV2_B$ when energized opens relay contact 28 or 27 respectively and through the conductor 29 and relay $F_3$ causes the cancellation of 3rd-degree braking. The relay $DV1_A$ or $DV1_B$ when energized opens a circuit including conductor 33 and relay $F_2$ to cause the cancellation of 2nd-degree braking. The relay $DV1_A$ or $DV1_B$ when energized opens a circuit including conductor 34 and relay $F_1$ to cause the cancellation of the 1st-degree braking. The relay $AV1_A$ or $AV1_B$ when energized effects 1st-degree acceleration of the driving motors by way of the conductor 35 and relay $C_1$. The relay $AV2_A$ or $AV2_B$ when energized effects 2nd-degree acceleration of the driving motors by way of the conductor 36 and relay $C_2$.

The arrangement shown makes it possible to produce these motor accelerations or brake releases according to whether the time $x$ taken to travel over the preceding section or step of the route has been greater, or not as great as, the values $X_2, X_3, X_4 \ldots X_{11}$ controlled by the relays $A_2, A_3, A_4 \ldots A_{11}$ respectively.

In order that it may be possible to rely upon the indications of time elapsed, as furnished by the closure of the rest contacts of the relays $A_2, A_3, A_4 \ldots A_{11}$, the latter have been supplemented by the insertion of a working contact of an auxiliary relay $A_{12}$ in the energization circuits of the control relays DV . . . and AV . . .

The closure of the working contact of the relay $A_{12}$ could not take place if the energization of the relays $A_2, A_3 \ldots A_{11}$ had failed at the passage of the preceding section or step. The relay $A_{12}$ can in fact only be energized if the whole cascade of relays $A_2, A_3 \ldots A_{11}$ is properly energized.

Once energized, this relay $A_{12}$, due to its holding contact remains under the sole control of a working contact of the relay $A_{11}$ and of one of its own contacts. It is moreover slightly delayed in dropping due to its construction.

It results from these arrangements that the relay $A_{12}$ can only have its working contacts closed if all the relays of the cascade were in proper working order when it was energized, and if the working contacts of the relay $A_1$ have not been cut off for a time greater than the individual time-delay of the relay $A_2$.

The control relays $DV3_A$ and $DV3_B$ have energizing and holding circuits. The circuits of the relay $DV3_A$ and those of the relay $DV3_B$ have no common points other than the positive and negative poles of the source which supplies them with current.

The circuits of the relays $DV3_A$ and $DV3_B$ are identical except on one point, i. e. those of the relay $DV3_A$ are controlled by the working contacts of the relay $A_1$, and those of the relay $DV3_B$ by the working contacts of the relay $B_1$.

Each of these relays $DV3_A$ and $DV3_B$ is provided with three circuits, for example, the three circuits of the relay $DV3_A$ are:

*First circuit.—Initiation of the regulation*

From positive at 11, through working contact 12 of the relay $A_1$, working contact 13 of the relay $A_{12}$, rest contact 14 of the relay $A_6$ (which checks the time $X_6$), winding of relay $DV3_A$ and back to negative 15.

*Second circuit.—Maintenance of the regulation*

From positive at 11, through working contact 12 of the relay $A_1$, working contact 13 of the relay $A_{12}$, rest contact 16 of the relay $A_2$ (which checks the time $X_2$), working contact 17 of the relay $DV3_B$, winding of the relay $DV3_A$ and back to negative at 15.

*Third circuit.—Cancellation of the regulation*

From positive at 11, through working contact 12 of the relay $A_1$, self-holding contact 18 of the relay $DV3_A$, winding of the relay $DV3_A$ and back to negative at 15.

It will be noted that these three circuits have the same starting point 11 and same terminal point at 15 and that they all pass through a working contact 12 of the relay $A_1$; the relay $DV3_A$ can therefore be energized only if the relay $A_1$ is energized.

The three circuits of the relay $DV3_B$ are symmetrical with those of the relay $DV3_A$. They have the same starting point at 11' and the same terminal point at 22; they all pass through a working contact 19 of the relay $B_1$; the relay $DV3_B$ can therefore be energized only if the relay $B_1$ is energized.

The first circuit (initiation) checks the time $X_6$ at the rest contact 21 of the relay $A_6$.

The second circuit (maintenance) checks the time $X_2$ at the rest contact 23 of the relay $A_2$ and passes through the working contact 24 of the relay $DV3_A$.

The third circuit (concellation) is ensured by the self-holding contact 25 of the relay $DV3_B$.

It has been seen above that, while the vehicle is travelling along the transmitter cables, the relays $A_1$ and $B_1$ are presented in the following successive positions:

| Stage | Position of the working contacts of the relays— ||
|---|---|---|
| | $A_1$ | $B_1$ |
| 1st | Closed | Open. |
| 2nd | do | Closed. |
| 3rd | Open | Do. |
| 4th | Closed | Do. |
| 5th | do | Open. |
| 6th | do | Closed. |
| etc | etc | etc. |

In the even stages 2, 4, 6, etc., the relays $A_1$ and $B_1$ have their working contacts closed and the cascade of relays $A_2 \ldots A_{12}$ is energized.

In alternate odd stages 1, 5, 9, etc., only the relay $A_1$ is in working position.

In the intermediate odd stages 3, 7, 11, etc., only the relay $B_1$ is in working position.

In all the odd stages 1, 3, 5, etc., the relays $A_2$, $A_3$, etc., close their rest contacts successively if $x$ is greater than $X_2$, $X_3$, etc.

The relay $A_2$ closes its lower contacts if $x$ exceeds the time $X_2$; the relay $A_3$ closes its lower contacts if $x$ exceeds the time $X_3$; the relay $A_4$ closes its lower contacts if $x$ exceeds the time $X_4$; and so on, the relay $A_{11}$ closing its lower contacts if $x$ exceeds the time $X_{11}$.

With the vehicle running, it will be assumed that, during the 1st stage for example, the relays $DV3_A$ and $DV3_B$ are both deenergized and 3rd-degree braking is in operation through the following circuit: From positive at 26, through the working contact 37 of relay $DV3_A$ or the working contact 38 of relay $DV3_B$, rest contact 27 of the relay $DV2_B$, rest contact 28 of the relay $DV2_A$ and conductor 29 to relay $F_3$ for producing the 3rd-degree braking and thence to negative at 39.

If the speed has been reduced sufficiently to call for the cancellation of the 3rd-degree braking, when the relay $A_1$ operates, the relay $A_6$ has time to close its rest contacts and through its contact 14 to close the circuit of the relay $DV3_A$ (first circuit) through the contacts 12, 13, 14. The relay $DV3_A$ is thereby energized and its working contact 18 closes the third circuit of the relay $DV3_A$ by the contacts 12, 18. The energizing of relay $DV3_A$ opens rest contact 28 and thereby cancels third degree braking. The vehicle continues to travel and the second stage begins.

As soon as the relay $B_1$ is energized, its working contact 19 closes the second (maintenance) circuit of the relay $DV3_B$ through the contacts 19, 25, if the speed has been reduced sufficiently for cancellation of this 2nd-degree braking. The vehicle continues to travel and the third stage begins.

When the relay $A_1$ is de-energized, its contact 12 opens all three circuits of the relay $DV3_A$, but the relay $DV3_B$ remains energized by its third circuit through the contacts 19, 25.

So long as the speed is not too fast for the relay $A_2$ to have time to close its rest contacts, i. e. so long as $x$ is greater than $X_2$, the relays $DV3_A$ and $DV3_B$ will control one another by closing in turn their second (maintenance) circuit and their third (cancellation) circuit. The operation of these relays is summarized in the following table in which "L" designates left and "R" designates right:

| Travel along the steps of the transmitter cable | Relay $DV3_A$ || Relay $DV3_B$ ||
|---|---|---|---|---|
| | Condition | Circuits closed | Condition | Circuits closed |
| L. Stage 1 | energized | 1, 2 and 3 | de-energized | none. |
| R. Stage 2 | do | 3 | energized | 2 and 3. |
| Stage 3 | de-energized | none | do | 3. |
| L. Stage 4 | energized | 2 and 3 | do | 3. |
| Stage 5 | do | 3 | de-energized | none. |
| R. Stage 6 | do | 3 | energized | 2 and 3. |
| Stage 7 | de-energized | none | do | 3. |
| etc | etc | etc | etc | etc. |

This table shows that the 3rd-degree braking is cancelled so long as the speed of the vehicle is such that the time $x$ for traversing each step of the route, after having been greater than $X_6$ (checked by the relay $A_6$) does not decrease below $X_2$ (checked by the relay $A_2$). As from the moment when the time $x$ reaches a value less than $X_2$, the 3rd-degree braking is brought into action and can only be cancelled if the speed decreases sufficiently for the time $x$ to reach a value greater than $X_6$.

The pairs of relays DV2, DV1, AV1 and AV2 have circuits exactly similar to those described above for the pair of relays DV3, except that the rest contacts of the relays $A_2$ and $A_6$ are therein replaced by rest contacts of the relays $A_3$ and $A_8$, $A_4$ and $A_9$, $A_5$ and $A_{10}$, $A_7$ and $A_{11}$ respectively. Their operation is identical, but the values of the speeds which determine their operation are those corresponding to the values of $x$ given in the following table:

| Control relay || Control initiated if $x$ is greater than— | Control maintained so long as $x$ is greater than— |
|---|---|---|---|
| Symbol | Duty | | |
| | Cancellation of breaking | | |
| $DV3_A$, $DV3_B$ | 3rd degree | $X_6$ | $X_2$ |
| $DV2_A$, $DV2_B$ | 2nd degree | $X_8$ | $X_3$ |
| $DV1_A$, $DV1_B$ | 1st degree | $X_9$ | $X_4$ |
| | Acceleration | | |
| $AV1_A$, $AV1_B$ | 1st degree | $X_{10}$ | $X_5$ |
| $AV2_A$, $AV2_B$ | 2nd degree | $X_{11}$ | $X_7$ |

It is to be noted that the control system above-described renders it unnecessary to provide any speedometer or speed-indicator device upon the driver's vehicle.

It is obvious that, without departing from the scope of the invention, it is possible to apply suitable modifications to the particular arrangements which have been described.

What I claim and desire to secure by Letters Patent is:

1. In a control system for continuously regulating the speed of a vehicle travelling along a fixed route so that the vehicle will have at each point along the route a speed equal to that of a predetermined ideal run, a series of spaced sections of transmitter cable extending along the route in each of two lines spaced laterally from one another, the sections in each line being staggered with respect to those of the other so that the sections in one line are opposite the spaces in the other, said sections recurring at regular intervals throughout the extent of said route and being of predetermined lengths, the length of each cable section being proportional to the speed desired for the vehicle in the vicinity of that section so that the time taken by a vehicle to travel the length of each and every section is always a predetermined value T if the vehicle is travelling at the desired speed, means for applying a periodic electric current to said cable, two receivers carried by the vehicle, one of said receivers being arranged to be energized by induction by the current in the cable sections in one line and the other arranged to be energized by induction by the current in the cable sections in the other line, and means for increasing or decreasing the speed of the vehicle in accordance with whether the duration of energization of each receiver is greater or less than the ideal time T.

2. A control system according to claim 1, in which a separate source of current is provided for each cable section.

3. A control system according to claim 1, in which the cable sections in the same line are connected in series, successive cable sections in the line being connected by conductors arranged so as to have no influence upon the receivers.

4. A control system according to claim 1, in which the cable sections in each of the lines are connected in series with one another and a common return is provided for the two lines.

5. A control system according to claim 1, in which the cable sections in each of the lines are connected in series and the two lines are connected in series with one another.

6. A control system according to claim 1, in which the cable sections are formed by a single cable extending along a zig-zag path with alternate sections of said cable in the said two lines.

7. In a control system for continuously regulating the speed of a vehicle travelling along a fixed route so that the vehicle will have at each point along the route a speed equal to that of a predetermined ideal run, a series of spaced sections of transmitter cable extending along the route in each of two lines spaced laterally from one another, the sections in each line being staggered with respect to those of the other so that the sections in one line are opposite the spaces in the other, said sections recurring at regular intervals throughout the extent of said route and being of predetermined lengths, the length of each cable section being proportional to the speed desired for the vehicle in the vicinity of that section so that the time taken by a vehicle to travel the length of each and every section is always a predetermined value T if the vehicle is travelling at the desired speed, means for applying a periodic electric current to said cable, driving means for accelerating the vehicle, braking means for decelerating the vehicle, a first control relay controlling the driving means, a second control relay controlling the braking means, two receivers carried by the vehicle, one of said receivers being arranged to be energized by induction by the current in the cable sections in one line and the other arranged to be energized by induction by the current in the other line, chronometric means carried by the vehicle to provide predetermined reference time intervals, and means for energizing said relays including means for comparing the duration of the energization of said receivers with said reference time intervals to put said driving means into operation when the duration of the energization of said receivers is greater than a time interval which is greater than the ideal time T and to put said braking means into operation when the duration of the energization of said relays is less than a predetermined time interval which is less than the ideal time T.

8. In a control system for continuously regulating the speed of a vehicle travelling along a fixed route so that the vehicle will have at each point along the route a speed equal to that of a predetermined ideal run, a series of spaced sections of transmitter cable disposed in a predetermined path extending along the route, said sections recurring at regular intervals throughout the extent of said route and being of predetermined lengths, the length of each cable section being proportional to the speed desired for the vehicle in the vicinity of that section so that the time taken by a vehicle to travel the length of each and every section is always a predetermined valve T if the vehicle is travelling at the desired speed, means for applying a periodic electric current to said cable, driving means for accelerating the vehicle, braking means for decelerating the vehicle, a receiver carried by the vehicle and arranged to travel along said path so as to be energized by induction by the current in the successive cable sections, contacts operated by said receiver, chronometric means set in motion at the start of operation of the receiver and having a series of contacts that are sequentially operated at predetermined time intervals after the start of operation of the receiver, and a control circuit for said driving and braking means, said control circuit including contacts of said chronometric means and contacts operated by the receiver to put the driving means into operation when the duration of the energization of said receiver is greater than a time interval which is greater than the ideal time T and to put the braking means into operation when the duration of the energization of said receiver is less than a time interval which is less than the ideal time T.

9. In a control system for continuously regulating the speed of a vehicle travelling along a fixed route so that the vehicle will have at each point along the route a speed equal to that of a predetermined ideal run, a series of spaced sections of transmitter cable disposed in a predetermined path extending along the route, said sections recurring at regular intervals throughout the extent of said route and being of predetermined lengths, the length of each cable section being proportional to the speed desired for the vehicle in the vicinity of that section so that the time taken by a vehicle to travel the length of each and every section is always a predetermined value T if the vehicle is travelling at the desired speed, means for applying a periodic electric current to said cable, and speed control equipment carried by the vehicle comprising means for accelerating the vehicle, means for decelerating the vehicle, a receiver carried by said vehicle and arranged to travel along said path so as to be energized by induction by the current in the successive cable sections so that each period of energization of the receiver corresponds to the time required for the vehicle to travel the length of a section, contacts operated by said receiver, chronometric relays having a series of contacts operated sequentially at predetermined time intervals after the energization of said receiver, and a control circuit including contacts operated by said receiver and contacts of said chronometric relays for putting the accelerating means in operation when the duration of the energization of said receiver is greater than a time interval which is greater than the ideal time T and to put the decelerating means into operation when the duration of the energization of said receiver is less than a time interval which is less than the ideal time T.

10. A control system according to claim 9, in which the chronometric relays comprise a series of relays each having an energizing circuit and operating contacts, said relays being connected in a cascade arrangement with the contacts of one relay closing the energizing circuit of the succeeding relay in the series, the inherent time delay in operation of the relays causing said relays to operate successively so that each operates at a predetermined time interval after the first in the series.

11. In a control system for continuously regulating the speed of a vehicle travelling along a fixed route so that the vehicle will have at each point along the route a speed equal to that of a predetermined ideal run, a series of spaced sections of transmitter cable disposed in a predetermined path extending along the route, said sections recurring at regular intervals throughout the extent of said route and being of predetermined lengths, the length of each cable section being proportional to the speed desired for the vehicle in the vicinity of that section so that the time taken by a vehicle to travel the length of each and every section is always a predetermined value T if the vehicle is travelling at the desired speed, means for applying a periodic electric current to said cable, and speed control equipment carried by the vehicle comprising means for producing acceleration of the vehicle, a receiver carried by the vehicle and arranged to travel along said path so as to be energized by induction by the current in the successive cable sections so that each period of energization of the receiver corresponds to the time required for the vehicle to travel the length of a section, relay contacts operated by said receiver, chronometric means set in operation upon energization of said receiver and having a series of contacts that are sequentially operated at predetermined time intervals after the start of operation of said receiver, and a control circuit for said accelerating means, said control circuit including contacts of said chronometric means and contacts operated by said receiver to put the accelerating means in operation when the duration of the energization of said receivers is greater than a predetermined time interval that is greater than the ideal time T and to maintain the accelerating means in operation as long as the periods of energization of said receiver are greater than a predetermined time interval less than the first mentioned time interval but greater than the ideal time T.

12. In a control system for continuously regulating the speed of a vehicle travelling along a fixed route so that the vehicle will have at each point along the route a speed equal to that of a predetermined ideal run, a series of spaced sections of transmitter cable disposed in a predetermined path extending along the route, said sections recurring at regular intervals throughout the extent of said route and being of predetermined lengths, the length of each cable section being proportional to the speed desired for the vehicle in the vicinity of that section so that the time taken by a vehicle to travel the length of each and every section is always a predetermined value T if the vehicle is travelling at the desired speed, means for applying a periodic electric current to said cable, and speed control equipment carried by the vehicle comprising means for producing a plurality of different degrees of acceleration of the vehicle, a receiver carried by the vehicle and arranged to be energized by said cable sections so that each period of energization of said receiver corresponds to the time required for the vehicle to travel the length of a section, relay contacts operated by said receiver, chronometric means set in operation upon the energization of said receiver and having a series of contacts that are sequentially operated at predetermined time intervals after the start of energization of said receiver, and a control circuit for said accelerating means, said control circuit including contacts of said chronometric means and contacts operated by said receiver to put one degree of acceleration into effect when the period of energization of said receiver is greater than a predetermined time interval that is greater than the ideal time T and to put a greater degree of acceleration into effect when the period of energization if said receiver is greater than another time interval which is greater than the first mentioned interval.

13. In a control system for continuously regulating the speed of a vehicle travelling along a fixed route so that the vehicle will have at each point along the route a speed equal to that of a predetermined ideal run, a series of spaced sections of transmitter cable disposed in a predetermined path extending along the route, said sections recurring at regular intervals throughout the extent of said route and being of predetermined lengths, the length of each cable section being proportional to the speed desired for the vehicle in the vicinity of that section so that the time taken by a vehicle to travel the length of each and every section is always a predetermined value T if the vehicle is travelling at the desired speed, means for applying a periodic electric current to said cable, and speed control equipment carried by the vehicle comprising means for producing a plurality of different degrees of acceleration, means for producing a plurality of different degrees of braking, a receiver carried by the vehicle and arranged to be energized by said cable sections so that each period of energization of said receiver corresponds to the time required for the vehicle to travel the length of a section, relay contacts operated by said receiver, chronometric means set in operation upon the energization of said receiver and having a series of contacts that are sequentially operated at predetermined time intervals after the start of energization of said receiver, and a control circuit for said accelerating means and braking means, said control circuit including contacts of said chronometric means and contacts operated by said receiver to put one degree of acceleration into effect when the period of energization of said receiver is greater than a first predetermined time interval that is greater than the ideal time T, to put a greater degree of acceleration into effect when the period of energization of said receiver is greater than a second time interval that is greater than the first mentioned interval, to put one degree of braking into effect when the period of energization of said receiver is less than a third time interval that is less than the ideal time T and to put a greater degree of braking into effect when the period of energization of said receiver is less than a fourth time interval that is shorter than said third interval.

14. In a control system for continuously regulating the speed of a vehicle travelling along a fixed route so that the vehicle will have at each point along the route a speed equal to that of a predetermined ideal run, a series of spaced sections of transmitter cable extending along the route in each of two lines spaced laterally from one another, the sections in each line being staggered with respect to those of the other, said sections recurring at regular intervals throughout the extent of said route and being of predetermined lengths, the length of each cable section being proportional to the speed desired for the vehicle in the vicinity of that section so that the time taken by a vehicle to travel the length of each and every section is always a predetermined value T if the vehicle is travelling at the desired speed, means for applying a periodic electric current to said cable, and speed control equipment carried by the vehicle comprising two receivers of which one is arranged to be energized by transmitter cable sections in one of said lines and the other is arranged to be energized by transmitter cable sections in the other of said lines whereby said receivers are energized alternately, relays controlled respectively by said receivers and each having contacts, a chronometric relay set into operation at the start of the periods of energization of said receivers and having a series of contacts that are closed sequentially at predetermined time intervals of graduated length measured from the start of energization of a receiver, at least one control relay which when energized causes acceleration of the vehicle and at least one other control relay which in its rest position allows vehicle braking means to operate, each of said control relays having an energizing circuit and means connecting said energizing circuits with contacts of the relays controlled by said receivers and respectively with selected contacts of the chronometric relay, said contacts operating to close the energizing circuit of the acceleration control relay when the period of energization of a receiver is greater than a predetermined time interval that is longer than the ideal time T and to open the energizing circuit of the brake control relay when the period of energization of a receiver is less than a predetermined time interval that is shorter than the ideal time T.

References Cited in the file of this patent

UNITED STATES PATENTS

| | | |
|---|---|---|
| 1,794,593 | Dodge et al. | Mar. 3, 1931 |
| 1,836,330 | Luddecke | Dec. 15, 1931 |
| 1,848,903 | Peiffer et al. | Mar. 8, 1932 |
| 1,875,942 | Schweyer | Sept. 6, 1932 |
| 2,317,400 | Paulus et al. | Apr. 27, 1943 |
| 2,492,388 | Martin | Dec. 27, 1949 |
| 2,493,755 | Ferrill | Jan. 10, 1950 |
| 2,576,424 | Sunstein | Nov. 27, 1951 |
| 2,661,070 | Ferrill | Dec. 1, 1953 |